US012771049B2

(12) United States Patent
Watanabe

(10) Patent No.: US 12,771,049 B2
(45) Date of Patent: Oct. 20, 2026

(54) CRIMP TERMINAL

(71) Applicant: YAZAKI CORPORATION, Tokyo (JP)

(72) Inventor: Kazuma Watanabe, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 331 days.

(21) Appl. No.: 18/644,130

(22) Filed: Apr. 24, 2024

(65) Prior Publication Data

US 2024/0275078 A1 Aug. 15, 2024

Related U.S. Application Data

(63) Continuation of application No. PCT/JP2023/004188, filed on Feb. 8, 2023.

(30) Foreign Application Priority Data

Feb. 16, 2022 (JP) ................................ 2022-022114

(51) Int. Cl.
*H01R 4/18* (2006.01)

(52) U.S. Cl.
CPC ............ *H01R 4/188* (2013.01); *H01R 4/184* (2013.01)

(58) Field of Classification Search
None
See application file for complete search history.

(56) References Cited

U.S. PATENT DOCUMENTS 4,003,623 A * 1/1977 Reynolds ............ H01R 4/2495 439/395
2003/0013353 A1* 1/2003 Sakaguchi ............ H01R 4/188 439/877
2013/0130565 A1 5/2013 Onuma et al.
2013/0143454 A1 6/2013 Onuma et al.
2023/0008910 A1 1/2023 Ito et al.

FOREIGN PATENT DOCUMENTS

JP 2010-198789 A 9/2010
JP 2010-244889 A 10/2010
JP 2012-38454 A 2/2012
JP 2012-38493 A 2/2012
JP 2023-9323 A 1/2023

OTHER PUBLICATIONS

International Search Report for PCT/JP2023/004188 dated May 9, 2023.

* cited by examiner

*Primary Examiner* — Tho D Ta

(74) *Attorney, Agent, or Firm* — KENEALY VAIDYA LLP

(57) ABSTRACT

A crimp terminal includes a conductor crimp portion that includes a bottom plate on which a conductor of an electric wire being disposed, and a pair of conductor swage pieces extending from both side edges of the bottom plate, the conductor crimp portion being crimped and connected to the conductor, by covering the conductor with the pair of conductor swage pieces and swaging the conductor. The conductor crimp portion includes a serration that extends in a groove shape over the pair of conductor swage pieces and the bottom plate, and in the serration, in a developed state before the conductor crimp portion is crimped to the conductor, a width of an opening of the serration is greater than or equal to a width of a bottom face of the serration.

4 Claims, 6 Drawing Sheets

CRIMP TERMINAL

CROSS-REFERENCE TO RELATED APPLICATION

This application is a continuation application of International Application No. PCT/JP2023/004188 filed on Feb. 8, 2023 which claims the benefit of priority from Japanese Patent Application No. 2022-022114 filed on Feb. 16, 2022 and designating the U.S., the entire contents of which are incorporated herein by reference.

BACKGROUND OF THE INVENTION

1. Field of the Invention

The present invention relates to a crimp terminal.

2. Description of the Related Art

A general crimp terminal that is crimped and connected to an electric wire includes a conductor crimp portion that is swaged to be crimped to a conductor of the electric wire that has been exposed at an end of the electric wire. The conductor crimp portion of the crimp terminal includes, for example, a bottom plate, and conductor swage pieces that have a plate shape, are located on both sides of the bottom plate in a direction that is orthogonal to an extending direction of the electric wire, and extend from the bottom plate, and in a state where the electric wire is disposed on the bottom plate, the electric wire is covered with the conductor swage pieces on both sides of the bottom plate, and is swaged, and therefore the conductor crimp portion is crimped to the electric wire.

Furthermore, in some conventional crimp terminals, a serration has been formed on a contact face with the conductor of the electric wire in the crimp terminal. For example, in Japanese Patent Application Laid-open No. 2010-198789 A, and Japanese Patent Application Laid-open No. 2010-244889 A, a serration including a plurality of recessed grooves that extends in a direction that is orthogonal to an extending direction of an electric wire has been formed on a contact face with a conductor of the electric wire in a crimp terminal, and this causes a reduction in the resistance of a crimp portion, which is electric resistance in a portion where the conductor of the electric wire is crimped to the crimp terminal.

Incidentally, in the crimp terminal, as described above, at the time of crimping the crimp terminal to the electric wire, the serration tears an oxide film of a core wire with an edge of the serration as a starting point, by using force at the time of crimping, and comes into contact with the core wire on a new surface obtained by removing the oxide film, and therefore an effect of reducing the resistance of the crimp portion is exhibited. However, the serration has room for improvement in a configuration that causes the resistance of the crimp portion to be stably reduced.

SUMMARY OF THE INVENTION

The present invention has been made in view of the above, and it is an object of the present invention to provide a crimp terminal that is capable of stably reducing the resistance of a crimp portion.

In order to solve the above mentioned problems and achieve the object, a crimp terminal according to one aspect of the present invention includes a conductor crimp portion that includes a bottom plate on which a conductor of an electric wire being disposed, and a pair of conductor swage pieces extending from both side edges of the bottom plate in a direction that intersects an extending direction of the conductor, the conductor crimp portion being crimped and connected to the conductor of the electric wire, by covering the conductor disposed on the bottom plate with the pair of conductor swage pieces and swaging the conductor, wherein the conductor crimp portion includes a serration in the direction that intersects the extending direction of the conductor that is disposed on the bottom plate, on a face on a side that comes into contact with the conductor, the serration extending in a groove shape over the pair of conductor swage pieces and the bottom plate, and in the serration, in a developed state where the conductor crimp portion has a flat plate shape before crimping to the conductor, a width in the extending direction of an opening of the serration is greater than or equal to a width in the extending direction of a bottom face of the serration, and a depth in a position of at least part of a portion that is located in each of the pair of conductor swage pieces is smaller than a depth of a portion that is located in the bottom plate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention is described in detail below with reference to the drawings. Note that this embodiment is not restrictive of this invention. Furthermore, components in the embodiment described below include components that those skilled in the art could easily replace, or substantially the same components.

EMBODIMENT

Figure 1:
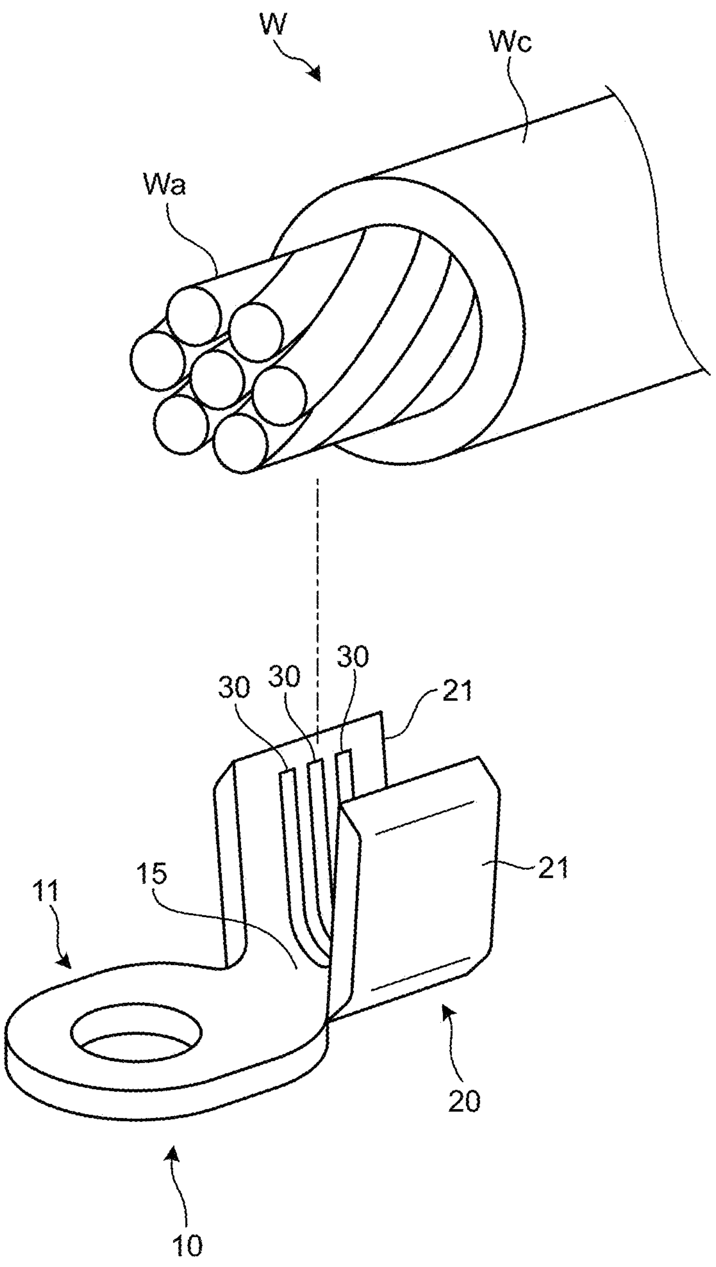
FIG. 1 is a perspective view of a crimp terminal according to an embodiment.

FIG. 1 is a perspective view of a crimp terminal 10 according to the embodiment. The crimp terminal 10 according to the embodiment is a member that is made of a metal material, and includes an electrical connection portion 11 and a conductor crimp portion 20 in a longitudinal direction of the crimp terminal 10, or from one end side to another end side in a longitudinal direction of a conductor Wa of an electric wire W to which the crimp terminal 10 will be crimped. The crimp terminal 10 according to the present embodiment is a crimp terminal 10 that is used for a high-voltage electric wire W through which a current flows at a high voltage. Therefore, the crimp terminal 10 is formed by using native copper having high conductivity.

From among the electrical connection portion 11 and the conductor crimp portion 20 included in the crimp terminal 10, the electrical connection portion 11 is a portion that is connected to a connection counterpart member serving as a connection target of the crimp terminal 10. Here, the connection counterpart member is, for example, a conductive member, such as a terminal or a bus bar, that is provided in a device serving as the connection target of the crimp terminal 10, or a ground member such as a vehicle body. The electrical connection portion 11 is fastened to the connection counterpart member by using a bolt to be electrically connected to the connection counterpart member. Furthermore, the conductor crimp portion 20 is a portion that is crimped to the conductor Wa of the electric wire W to which the crimp terminal 10 will be crimped. Specifically, the conductor crimp portion 20 includes a bottom plate 15 and a conductor swage piece 21. The bottom plate 15 is a plate-shaped member, and is a portion where the conductor Wa of the electric wire W to which the crimp terminal 10 will be crimped is disposed. Furthermore, a pair of conductor swage pieces 21 extend from both side edges of the bottom plate 15 in a direction that intersects an extending direction of the conductor Wa of the electric wire W.

Namely, the conductor swage piece 21 is disposed to extend from each of both sides of the bottom plate 15 in a width direction of the bottom plate 15. For example, as illustrated in FIG. 1, each of both conductor swage pieces 21 is bent from the bottom plate 15 toward a side where the electric wire W is disposed on the bottom plate 15 in a thickness direction of the bottom plate 15, and in the state of FIG. 1 before crimping to the electric wire W, when viewed in the extending direction of the electric wire W, the bottom plate 15 and the conductor swage pieces 21 are formed in a roughly U-shape.

Furthermore, on a face on a side that comes into contact with the conductor Wa of the electric wire W in the conductor crimp portion 20, a serration 30 that extends in a groove shape over the pair of conductor swage pieces 21 and the bottom plate 15 has been formed in a direction that intersects the extending direction of the conductor Wa that is disposed on the bottom plate 15. Namely, the serration 30 has been formed on an inner face side in a direction in which the conductor swage pieces 21 are bent relative to the bottom plate 15. A plurality of serrations 30 that is formed in a groove shape is disposed side by side in the extending direction of the electric wire W to which the conductor crimp portion 20 will be crimped, and in the present embodiment, three serrations 30 are disposed side by side in the extending direction of the electric wire W to which the conductor crimp portion 20 will be crimped.

Figure 2:
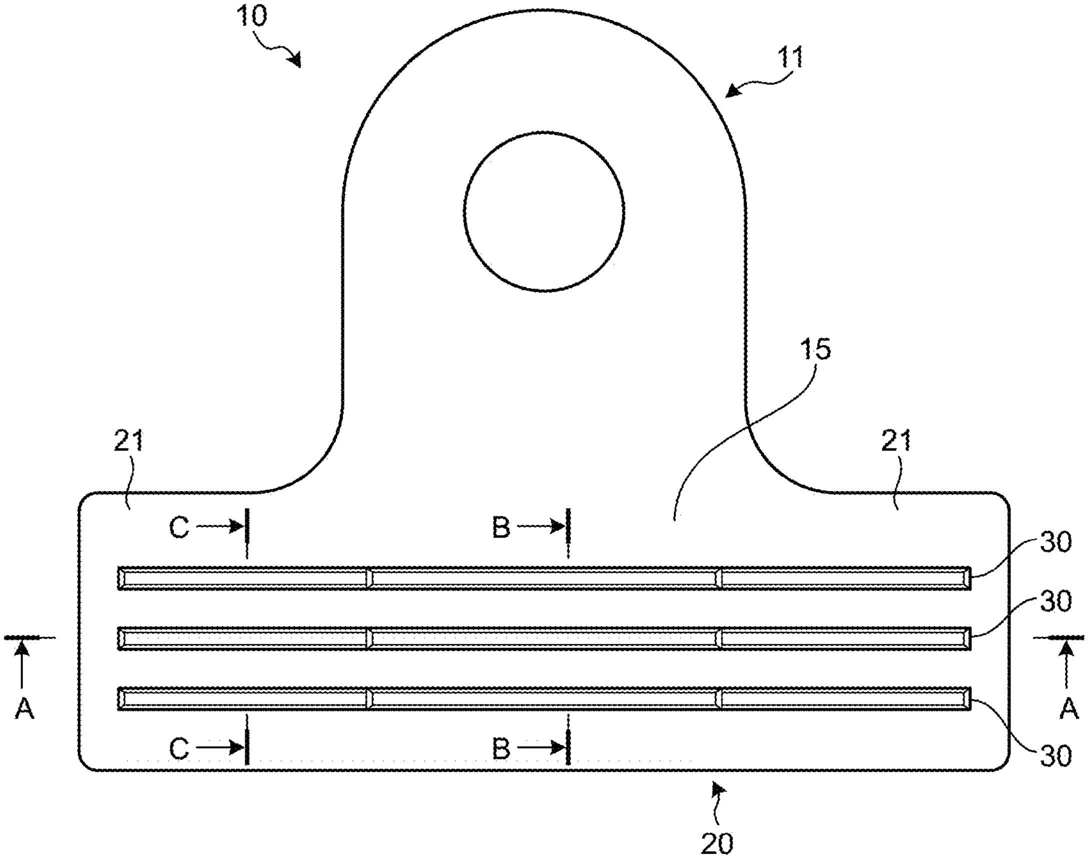
FIG. 2 is an explanatory diagram in a developed state of the crimp terminal illustrated in FIG. 1.

FIG. 2 is an explanatory diagram in a developed state of the crimp terminal 10 illustrated in FIG. 1. In a developed state where the conductor crimp portion 20 has a flat plate shape before crimping to the conductor Wa (see FIG. 1) of the electric wire W, the serrations 30 formed in the conductor crimp portion 20 have been formed to cross the bottom plate 15 from one conductor swage piece 21 to another conductor swage piece 21 from among the pair of conductor swage pieces 21 included in the conductor crimp portion 20. Namely, the serrations 30 have been formed in a direction that intersects the extending direction of the conductor Wa that is disposed on the bottom plate 15, and in the present embodiment, the serrations 30 have been formed in a direction that is substantially orthogonal to the extending direction of the conductor Wa that is disposed on the bottom plate 15. In other words, the serrations 30 have been formed in an orientation in which the extending direction of the conductor Wa that is disposed on the bottom plate 15 is a width direction of a groove that is a shape of the serrations 30.

Figure 3:
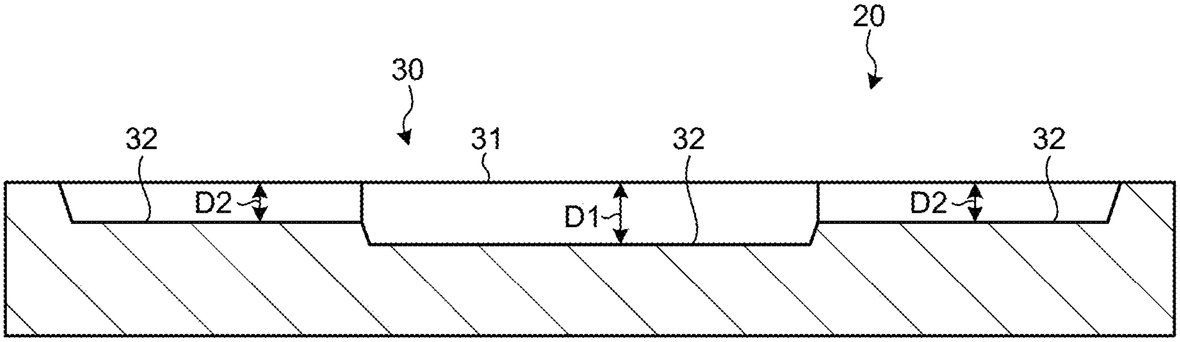
FIG. 3 is an A-A sectional view of FIG. 2.
Figure 4:
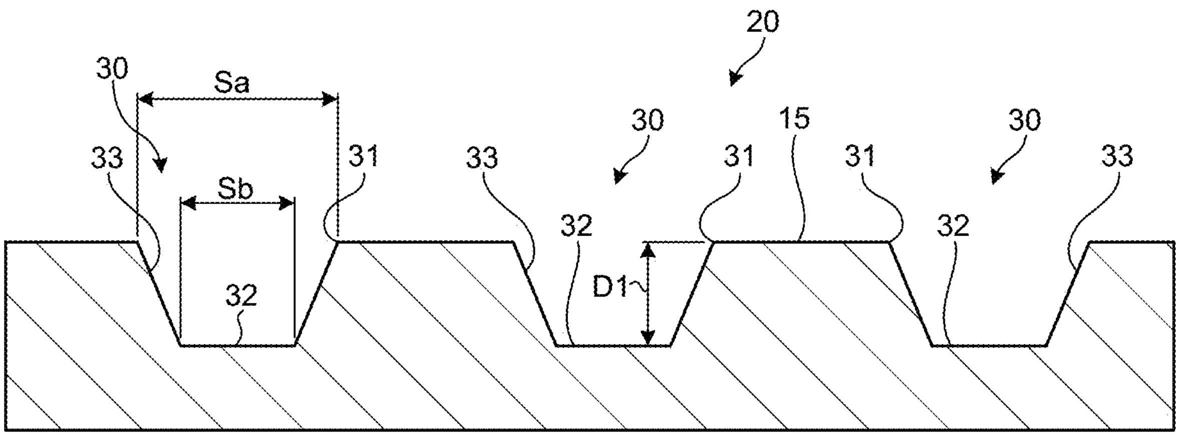
FIG. 4 is a B-B sectional view of FIG. 2.
Figure 5:
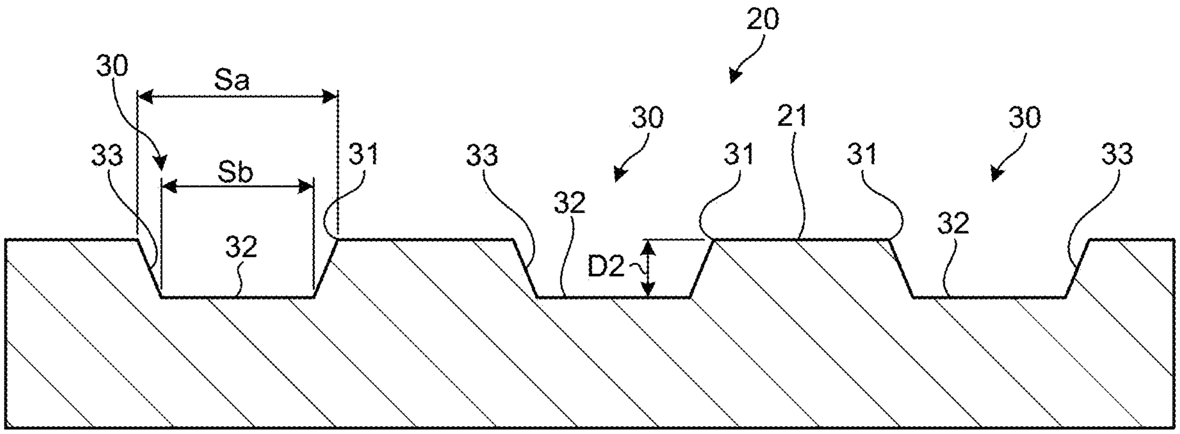
FIG. 5 is a C-C sectional view of FIG. 2.

FIG. 3 is an A-A sectional view of FIG. 2. FIG. 4 is a B-B sectional view of FIG. 2. FIG. 5 is a C-C sectional view of FIG. 2. The serration 30 has been formed in a groove shape that includes a bottom face 32 and a side face 33, and is open to a face on a side to which the conductor Wa is crimped in the conductor crimp portion 20, in an opening 31. Furthermore, in the serration 30, in the developed state where the conductor crimp portion 20 has a flat plate shape before crimping to the conductor Wa, a width Sa of the electric wire W of the opening 31 of the serration 30 in the extending direction of the conductor Wa is greater than or equal to a width Sb of the bottom face 32 of the serration 30 in the extending direction of the conductor Wa of the electric wire W. Namely, in the serration 30, in the developed state where the conductor crimp portion 20 has a flat plate shape, the width Sa of the opening 31 is greater than the width Sb of the bottom face 32 of the serration 30 in any position in a longitudinal direction of the serration 30. Therefore, the serration 30 has been formed in such a way that the side face 33 is inclined relative to a normal line of the bottom face 32.

Furthermore, in the serration 30, in the developed state where the conductor crimp portion 20 has a flat plate shape before crimping to the conductor Wa, a depth D2 in a position of at least part of a portion that is located in the conductor swage piece 21 is smaller than a depth D1 of a portion that is located in the bottom plate 15. Namely, in the serration 30, the depth D2 from a position of the opening 31 to the bottom face 32 in a depth direction of the serration 30 in a position of at least part of the position that is located in the conductor swage piece 21 is smaller than the depth D1 from the position of the opening 31 to the bottom face 32 in the depth direction of the serration 30 in the portion that is located in the bottom plate 15.

In the serration 30, for example, an angle of the side face 33 relative to the normal line of the bottom face 32 is formed to be the same in the portion that is located in the conductor swage piece 21 and the portion that is located in the bottom plate 15, and a depth differs between the portion that is located in the conductor swage piece 21 and the portion that is located in the bottom plate 15. In this case, in the serration 30, the width Sb of the bottom face 32 of the portion that is located in the conductor swage piece 21 is formed to be greater than the width Sb of the bottom face 32 in the portion that is located in the bottom plate 15.

In the present embodiment, in the serration 30, in the developed state where the conductor crimp portion 20 has a flat plate shape, the depth changes near a portion of coupling to the bottom plate 15 in the conductor swage piece 21, and in the depth of the serration 30, the depth D2 of a portion that is located on a side of the conductor swage piece 21 is smaller than the depth D1 of a portion that is located on a side of the bottom plate 15. Namely, in the serration 30, the bottom face 32 has a difference in level near the portion of coupling to the bottom plate 15 in the conductor swage piece 21, and therefore the depth differs between the portion that is located on the side of the bottom plate 15 and the portion that is located on the side of the conductor swage piece 21. Therefore, in the serration 30, in the developed state where the conductor crimp portion 20 has a flat plate shape, the depth D2 in almost all of the portion that is located in the conductor swage piece 21 in the serration 30 is smaller than the depth D1 of the portion that is located in the bottom plate 15.

As an example of the depth of the serration 30, in the crimp terminal 10 having a thickness of 0.8 mm in the developed state where the conductor crimp portion 20 has a flat plate shape, the depth D1 of the portion that is located in the bottom plate 15 is 0.10 mm, and the depth D2 of the portion that is located in the conductor swage piece 21 is 0.05 mm. Furthermore, as another example of the depth of the serration 30, in the crimp terminal 10 having a thickness of 2.3 mm in the developed state where the conductor crimp portion 20 has a flat plate shape, the depth D1 of the portion that is located in the bottom plate 15 is 0.25 mm, and the depth D2 of the portion that is located in the conductor swage piece 21 is 0.13 mm. As described above, in the depth of the serration 30 in the developed state where the conductor crimp portion 20 has a flat plate shape, it is preferable that the depth D2 of the position that is located in the conductor swage piece 21 be about 50% of the depth D1 of the portion that is located in the bottom plate 15.

Note that in the description of a shape of the serration 30, the serration 30 in the developed state where the conductor crimp portion 20 has a flat plate shape has been described, but the crimp terminal 10 as a single component is handled in a state where the bottom plate 15 and the pair of conductor swage pieces 21 form a roughly U-shape, as illustrated in FIG. 1.

The crimp terminal 10 according to the present embodiment includes the configuration described above, and the workings of the crimp terminal 10 are described next. The crimp terminal 10 according to the present embodiment is used in a state where the crimp terminal 10 is crimped to the electric wire W in which the conductor Wa that is made of metal and has a linear shape is coated with insulating coating Wc. In crimping the crimp terminal 10 to the electric wire W, the insulating coating Wc that is located near an end of the electric wire W is removed, and in a state where the conductor Wa has been exposed near the end of the electric wire W, the electric wire W is introduced between the pair of conductor swage pieces 21 included in the crimp terminal 10. In introducing the electric wire W between the conductor swage pieces 21 of the crimp terminal 10, the electric wire W is introduced, for example, in a state where the crimp terminal 10 is placed on a female mold (an anvil) (not illustrated) that is used in crimping the crimp terminal 10 to the electric wire W.

In this case, in the electric wire W, the exposed conductor Wa is introduced between the pair of conductor swage pieces 21, and the exposed conductor Wa in the electric wire W is located in the conductor crimp portion 20. This causes the conductor Wa of the electric wire W to be disposed on the bottom plate 15 included in the conductor crimp portion 20 of the crimp terminal 10.

When the electric wire W has been introduced between the conductor swage pieces 21 of the crimp terminal 10, the conductor swage pieces 21 are swaged. In swaging the conductor swage pieces 21 of the crimp terminal 10, a male mold (a crimper) (not illustrated) that is used in crimping the crimp terminal 10 to the electric wire W is lowered from the above of the crimp terminal 10 toward the crimp terminal 10. As a result of this, the crimp terminal 10 in which the electric wire W is disposed on the bottom plate 15 is sandwiched between the male mold and the female mold, and a guiding face that is formed on a face on a side that faces the crimp terminal 10 in the male mold rounds the conductor swage pieces 21 in such a way that the conductor swage pieces 21 are folded to a side where the electric wire W is disposed.

Each of the pair of conductor swage pieces 21 is rounded to be folded to a side where the electric wire W is disposed, as described above, and therefore the pair of conductor swage pieces 21 are swaged to the conductor Wa in the state of covering the conductor Wa of the electric wire W that is disposed on the bottom plate 15. The conductor crimp portion 20 including the conductor swage pieces 21 covers, with the conductor swage pieces 21, the conductor Wa of the electric wire W that is disposed on the bottom plate 15, and swages the conductor Wa, and therefore the conductor crimp portion 20 is crimped and connected to the conductor Wa of the electric wire W. This causes the crimp terminal 10 to be crimped and connected to the electric wire W in a state where a face on a side where the serrations 30 are formed in the conductor swage pieces 21 and the bottom plate 15 that are included in the conductor crimp portion 20 comes into contact with the conductor Wa of the electric wire W.

Figure 6:
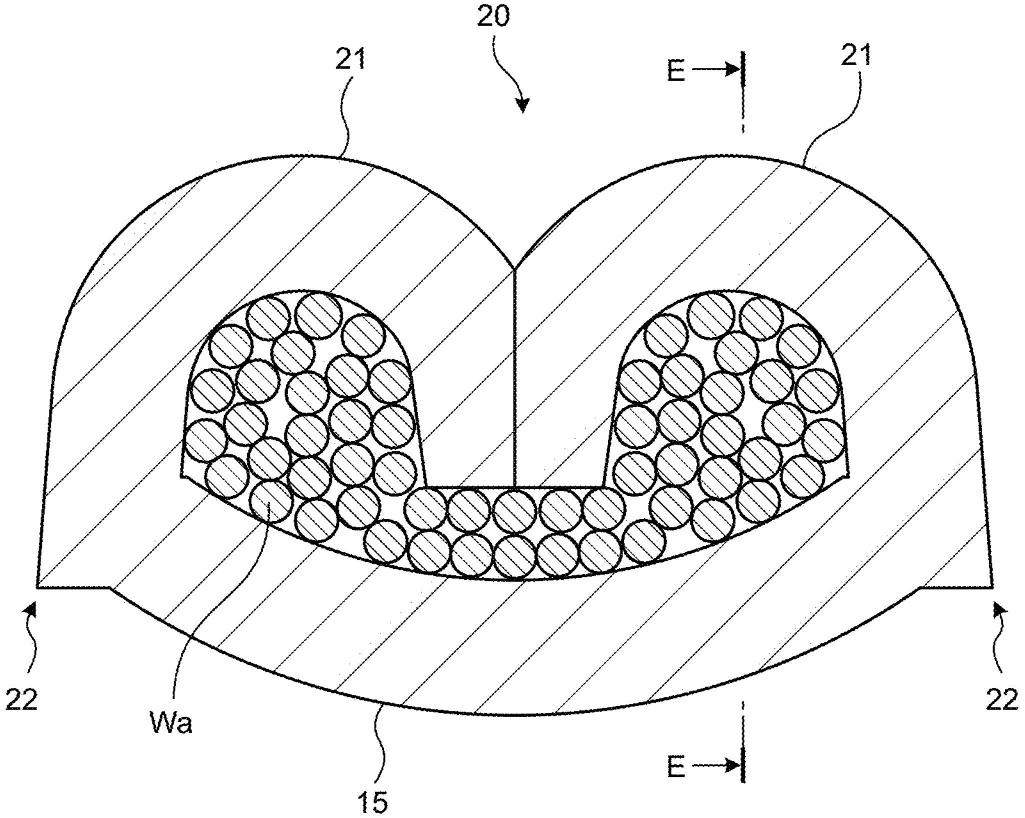
FIG. 6 is a sectional view of a conductor crimp portion viewed in an extending direction of a conductor, in a state where conductor swage pieces have been swaged, and the conductor crimp portion has been crimped to an electric wire W.

FIG. 6 is a sectional view of the conductor crimp portion 20 viewed in the extending direction of the conductor Wa, in a state where the conductor swage pieces 21 have been swaged, and the conductor crimp portion 20 has been crimped to the electric wire W. In a state where the conductor crimp portion 20 has been crimped to the conductor Wa of the electric wire W, both the pair of conductor swage pieces 21 are greatly curved in a direction in which the pair of conductor swage pieces 21 are curved to protrude to a side opposite to a side that comes into contact with the conductor Wa, in a case where the conductor crimp portion 20 is viewed in the extending direction of the conductor Wa. On the other hand, the bottom plate 15 does not significantly change in shape before and after the conductor crimp portion 20 is crimped to the conductor Wa in comparison with the conductor swage pieces 21, and the bottom plate 15 is gently curved in a direction in which the bottom plate 15 protrudes to a side opposite to the side that comes into contact with the conductor Wa, in a case where the conductor crimp portion 20 is viewed in the extending direction of the conductor Wa.

Therefore, in a state after the conductor crimp portion 20 has been crimped to the conductor Wa, a radius of curvature of the conductor swage pieces 21 is smaller than a radius of curvature of the bottom plate 15 in a case where the conductor crimp portion 20 is viewed in the extending direction of the conductor Wa. In other words, in a state after the conductor crimp portion 20 has been crimped to the conductor Wa, a curvature of the conductor swage pieces 21 is greater than a curvature of the bottom plate 15 in a case where the conductor crimp portion 20 is viewed in the extending direction of the conductor Wa.

The serrations 30 have been formed in the conductor crimp portion 20 including the conductor swage pieces 21 that are to be curved, as described above, at the time of crimping to the conductor Wa, and in the serrations 30, in the developed state where the conductor crimp portion 20 has a flat plate shape, the depth D2 of almost all of the portion that is located in the conductor swage pieces 21 is smaller than the depth D1 of the portion that is located in the bottom plate 15. Therefore, in the conductor swage pieces 21 in which the serrations 30 are formed, in the case of being viewed in the extending direction of the conductor Wa in a state after the conductor crimp portion 20 has been crimped to the conductor Wa, the depth D2 of the serrations 30 in the developed state of the conductor crimp portion 20 of a portion having a smallest radius of curvature of the conductor swage piece 21 is smaller than the depth D1 of the portion that is located in the bottom plate 15. Namely, the serrations 30 have been formed to differ in depth between a side of the bottom plate 15 and a side of the conductor swage piece 21 by using, as a boundary, a swage piece base 22, which is a position having a large change in curvature at a time when the conductor swage pieces 21 are curved relative to the bottom plate 15 in crimping the conductor crimp portion 20 to the conductor Wa.

Here, when a plate-shaped member has been curved in a plate thickness direction, compression force acts on an inner side in a curving direction. Therefore, in a case where the conductor crimp portion 20 has been crimped to the conductor Wa by greatly curving the conductor swage pieces 21 and swaging the conductor swage pieces 21 to the conductor Wa of the electric wire W, similarly, compression force acts on the conductor swage pieces 21 on the inner side in the curving direction. Namely, compression force acts on the conductor swage pieces 21 that have been swaged to the conductor Wa in a position closer to a face on a side where the conductor Wa is located in the thickness direction of the conductor swage pieces 21.

Figure 7:
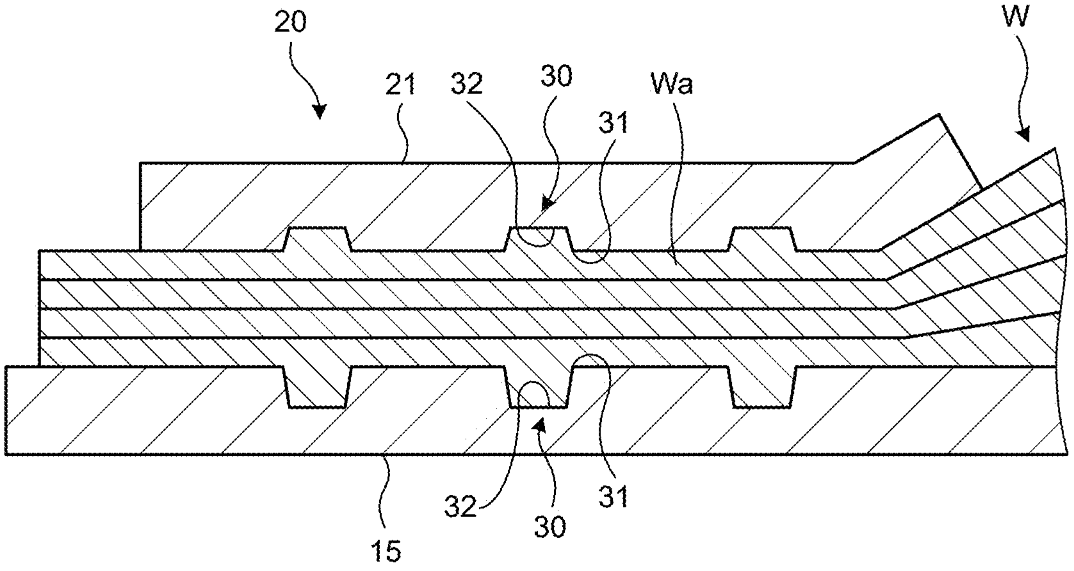
FIG. 7 is an E-E sectional view of FIG. 6.

FIG. 7 is an E-E sectional view of FIG. 6. The serrations 30 have been formed on a face on a side that comes into contact with the conductor Wa in the conductor swage pieces 21, and in a case where compression force has acted on portions on a side where the conductor Wa is located in the thickness direction of the conductor swage pieces 21 by greatly curving the conductor swage pieces 21, the serrations 30 are easily compressed by the compression force. In this case, portions that are located in the conductor swage pieces 21 in the serrations 30 are compressed by the compression force, for example, in a direction in which the width of the opening 31 becomes smaller. As a result of this, the portions that are located in the conductor swage pieces 21 in the serrations 30 are easily deformed in the direction in which the width of the opening 31 becomes smaller.

When the conductor swage pieces 21 have been swaged, the portions that are located in the conductor swage pieces 21 in the serrations 30 are deformed in a direction in which the width of the opening 31 becomes smaller, and in the serrations 30, in the developed state where the conductor crimp portion 20 has a flat plate shape, the depth D2 in a position of at least part of the portion that is located in the conductor swage piece 21 is smaller than the depth D1 of the portion that is located in the bottom plate 15. Therefore, the periphery of the portion that is located in the conductor swage piece 21 in the serrations 30 has rigidity that is higher than rigidity of the periphery of a portion that is located in the bottom plate 15 in the serrations 30. As a result of this, the portion that is located in the conductor swage piece 21 in the serrations 30 is not likely to be deformed in the direction in which the width of the opening 31 becomes smaller, even in a case where force acts in the direction in which the width of the opening 31 becomes smaller by greatly curving the conductor swage pieces 21.

Accordingly, in the portions that are located in the conductor swage pieces 21 in the serrations 30, the width of the opening 31 is not likely to become smaller than the width of the bottom face 32, and what is called inward tilting, which is a state where the side faces 33 of the serration 30 tilt in a direction in which the width of the opening 31 becomes smaller than the width of the bottom face 32, is not likely to occur. As a result of this, in the portions that are located in the conductor swage pieces 21 in the serrations 30, a state where the width of the opening 31 is greater than the width of the bottom face 32 is maintained, even in a case where the conductor swage pieces 21 have been greatly curved, and have been deformed in the direction in which the width of the opening 31 becomes smaller.

On the other hand, in a portion that is located in the conductor crimp portion 20 in the bottom plate 15, the bottom plate 15 is not greatly deformed even in a case where the conductor swage pieces 21 have been swaged. Therefore, in portions that are located in the bottom plate 15 in the serrations 30, even in a case where the conductor swage pieces 21 are swaged and the conductor crimp portion 20 is crimped to the conductor Wa of the electric wire W, the side faces 33 are not likely to inwardly tilt, and a state where the width of the opening 31 is greater than the width of the bottom face 32 is maintained similarly to the developed state where the conductor crimp portion 20 has a flat plate shape.

In swaging the conductor swage pieces 21 and crimping the conductor crimp portion 20 to the conductor Wa of the electric wire W, a heavy load acts on the conductor Wa from the conductor crimp portion 20. Namely, in crimping the conductor crimp portion 20 to the conductor Wa of the electric wire W, a heavy load acts on the conductor Wa from the conductor crimp portion 20 due to force that is applied to the crimp terminal 10 from the male mold and the female mold to crimp the conductor crimp portion 20 to the conductor Wa. As a result of this, the conductor Wa comes into close contact with the conductor crimp portion 20, and portions that are located on the serrations 30 are introduced into the serrations 30.

In this case, in the serrations 30, the width of the opening 31 in the serrations 30 is also greater than the width of the bottom face 32 after the conductor swage pieces 21 have been swaged, and a shape in which the width becomes greater in a portion closer to the opening 31 from the bottom face 32 is maintained. In particular, in swaging the conductor swage pieces 21, the conductor swage pieces 21 are greatly curved, and therefore in portions that are formed in the conductor swage pieces 21 in the serrations 30, the side faces 33 are likely to inwardly tilt such that a width on a side of the opening 31 becomes smaller, but in the present embodiment, the side faces 33 are not likely to inwardly tilt, even after the conductor swage pieces 21 have been swaged. As a result of this, in the portions that are formed in the conductor swage pieces 21 in the serrations 30, a state where the width on the side of the opening 31 is greater than a width on a side of the bottom face 32 is also maintained after the conductor swage pieces 21 have been swaged.

Figure 8:
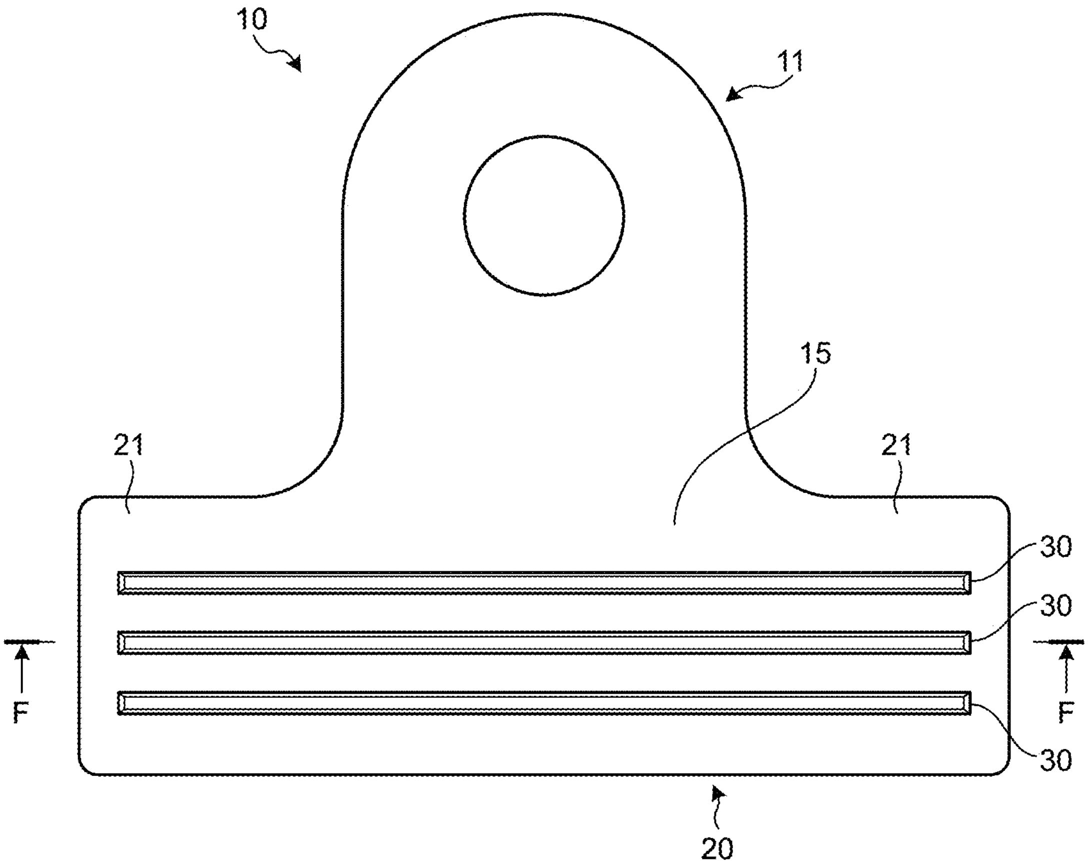
FIG. 8 is an explanatory diagram of a crimp terminal in which a serration is formed to have the same depth in a position of a bottom plate and a position of a conductor swage piece in a developed state where a conductor crimp portion has a flat plate shape.
Figure 9:
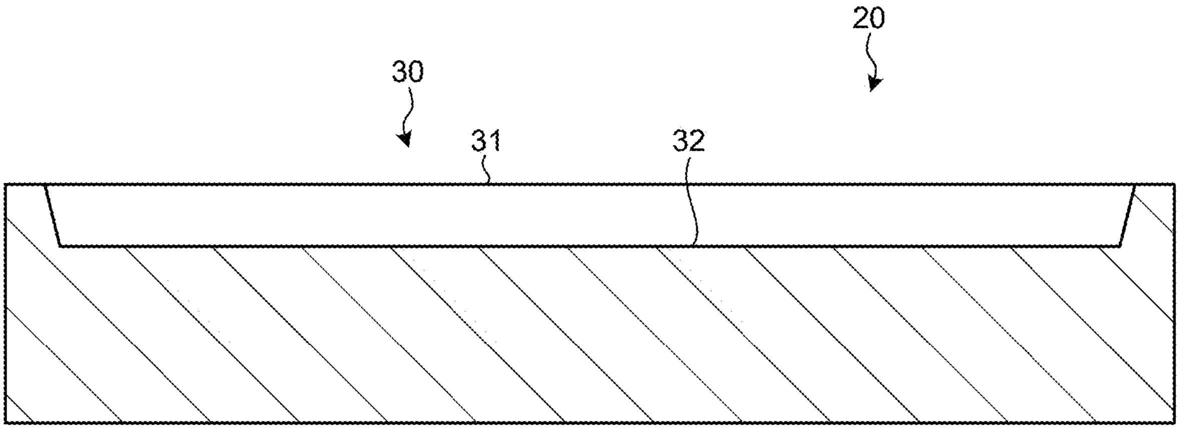
FIG. 9 is an F-F sectional view of FIG. 8.
Figure 10:
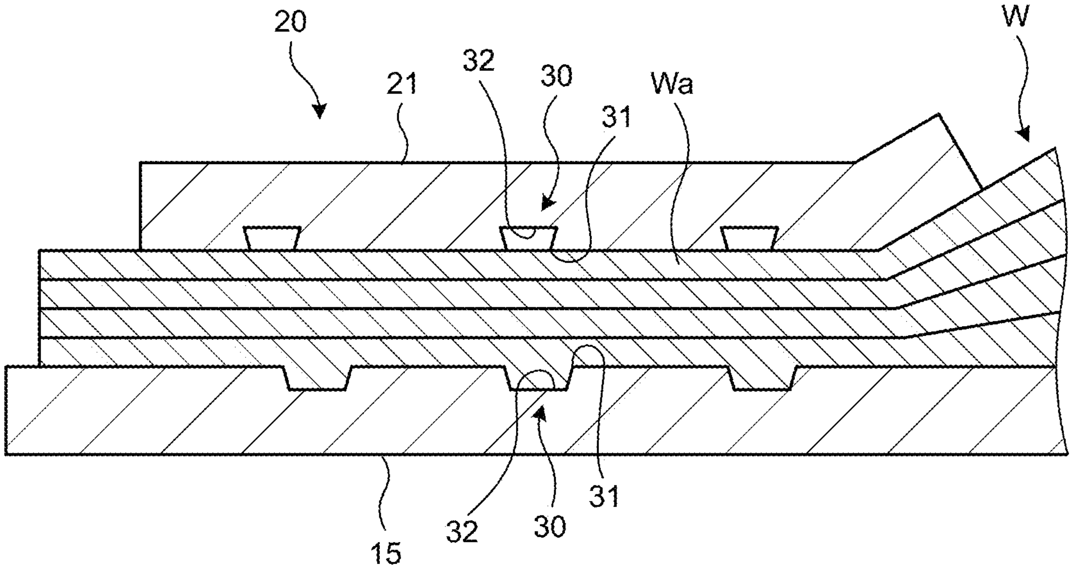
FIG. 10 is an explanatory diagram illustrating a state where conductor swage pieces of the conductor crimp portion illustrated in FIGS. 8 and 9 have been swaged, and have been crimped to a conductor.

FIG. 8 is an explanatory diagram of a crimp terminal 10 in which the serrations 30 are formed to have the same depth in a position of the bottom plate 15 and a position of the conductor swage piece 21 in the developed state where the conductor crimp portion 20 has a flat plate shape. FIG. 9 is an F-F sectional view of FIG. 8. FIG. 10 is an explanatory diagram illustrating a state where the conductor swage pieces 21 of the conductor crimp portion 20 illustrated in FIGS. 8 and 9 have been swaged, and have been crimped to the conductor Wa. In a case where the serrations 30 formed in the conductor crimp portion 20 have a depth of the serrations 30 that is constant in the portion that is located in the conductor swage piece 21 and the portion that is located in the bottom plate 15 in the developed state where the conductor crimp portion 20 has a flat plate shape, as illustrated in FIGS. 8 and 9, when the conductor swage pieces 21 have been swaged, the conductor Wa is not likely to be introduced into the portion that is located in the conductor swage piece 21 in the serrations 30.

Namely, in a case where the depth of the serrations 30 is constant in the portion that is located in the conductor swage piece 21 and the portion that is located in the bottom plate 15 in the serrations 30, the rigidity of the periphery of the portion that is located in the conductor swage piece 21 in the serrations 30 is similar to the rigidity of the periphery of the portion that is located in the bottom plate 15 in the serrations 30. In this case, when the conductor swage pieces 21 have been greatly curved and have been swaged, in the portions that are located in the conductor swage pieces 21 in the serrations 30, the side faces 33 easily inwardly tilt due to compression force that is generated on an inner side in a curving direction when the conductor swage pieces 21 have been greatly curved. As a result of this, the portions that are located in the conductor swage pieces 21 in the serrations 30 are easily deformed in the direction in which a width on a side of the opening 31 becomes smaller, as illustrated in FIG. 10, when the conductor swage pieces 21 have been greatly curved and have been swaged. Therefore, in a case where the conductor crimp portion 20 has been crimped to the conductor Wa by swaging the conductor swage pieces 21, the serrations 30 have a shape that is difficult to apply a heavy load to the conductor Wa from edges, and therefore it is difficult for the serrations 30 to dig into the conductor Wa.

In contrast, in the present embodiment, in the serrations 30, in the developed state where the conductor crimp portion 20 has a flat plate shape, the depth D2 of the portion that is located in the conductor swage piece 21 is smaller than the depth D1 of the portion that is located in the bottom plate 15, and therefore even in a case where compression force has acted by greatly curving the conductor swage pieces 21, the width of the opening 31 in the portion that is located in the conductor swage piece 21 is not likely to become smaller. Therefore, when the conductor crimp portion 20 has been crimped to the conductor Wa, the serrations 30 easily apply a heavy load to the conductor Wa from the edges, and have a shape that easily causes the edges to dig into the conductor Wa. Accordingly, the edges of the serrations 30 dig into the conductor Wa, and therefore portions that are adjacent to the conductor swage pieces 21 in the conductor Wa and the conductor swage pieces 21 can tear an oxide film of a core wire of the conductor Wa with the edges of the serrations 30 as a starting point, by using force at the time of crimping. This can bring a new surface obtained by removing the oxide film into contact with the core wire, and the resistance of the crimp portion, which is electric resistance in a portion where the conductor Wa is crimped to the crimp terminal 10, is reduced.

Furthermore, a portion on a side of the bottom plate 15 in the conductor crimp portion 20 is not likely to change in shape in comparison with a state before crimping, even in a case where the conductor crimp portion 20 has been crimped to the conductor Wa, and portions that are located in the bottom plate 15 in the serrations 30 are not likely to change in shape either. Therefore, even in a case where the conductor crimp portion 20 has been crimped to the conductor Wa, the portions that are located in the bottom plate 15 in the serrations 30 keep a state where a width on a side of the opening 31 is greater than a width on a side of the bottom face 32. Accordingly, in a portion that is adjacent to the bottom plate 15 in the conductor Wa, the edges of the serrations 30 easily dip into the conductor Wa due to a load that acts on the conductor Wa from the conductor crimp portion 20 at the time of crimping. As a result of this, the portion that is adjacent to the bottom plate 15 in the conductor Wa and the bottom plate 15 can also tear the oxide film of the core wire of the conductor Wa with the edges of the serrations 30 as a starting point, by using the force at the time of crimping, and therefore the resistance of the crimp portion is reduced.

In the crimp terminal 10 according to the embodiment described above, in the serrations 30 formed in the conductor crimp portion 20, in the developed state where the conductor crimp portion 20 has a flat plate shape, the depth D2 in a position of at least part of a portion that is located in the conductor swage piece 21 is smaller than the depth D1 of a portion that is located in the bottom plate 15. As a result of this, in a case where the conductor crimp portion 20 has been crimped to the conductor Wa by swaging the conductor swage pieces 21, the side faces 33 can be prevented from inwardly tilting in the portions that are located in the conductor swage pieces 21 in the serrations 30 due to compression force at the time of curving the conductor swage pieces 21. Therefore, even in a case where the conductor crimp portion 20 has been crimped to the conductor Wa, the width of the opening 31 in the portions that are located in the conductor swage pieces 21 in the serrations 30 can be prevented from becoming smaller than the width of the bottom face 32 in the serrations 30.

As a result of this, even in a situation where the conductor swage pieces 21 are greatly curved and swaged, and the inward tilting of the side faces 33 is likely to cause the width of the opening 31 to become smaller in the portions that are located in the conductor swage pieces 21 in the serrations 30, the edges of the serrations 30 can be caused to easily dip into the conductor Wa. Accordingly, in a case where the conductor swage pieces 21 have been swaged, and the conductor crimp portion 20 has been crimped to the conductor Wa, force at the time of crimping can tear the oxide film of the core wire of the conductor Wa with the edges of the serrations 30 as a starting point, and therefore a new surface obtained by removing the oxide film can come into contact with the core wire. This enables electric resistance to be reduced between the conductor Wa and the crimp terminal 10. As a result of this, the resistance of the crimp portion can be stably reduced.

Furthermore, when the conductor swage pieces 21 have been swaged, and the conductor crimp portion 20 has been crimped to the conductor Wa, the edges of the serrations 30 dig into the conductor Wa in both positions on the side of the conductor swage piece 21 and the side of the bottom plate 15 in the conductor Wa, and this can restrict a relative movement of the conductor Wa and the conductor crimp portion 20. As a result of this, mechanical connection force between the conductor Wa and the conductor crimp portion 20 can be strengthened.

Furthermore, in a case where the crimp terminal 10 is made of native copper, conductivity is high, but mechanical strength is low in comparison with a case where the crimp terminal 10 is made of a copper alloy, and therefore in a case where the conductor crimp portion 20 has been crimped to the conductor Wa, inward tilting is likely to occur in the portions that are located in the conductor swage pieces 21 in the serrations 30. In contrast, in the present embodiment, in the crimp terminal 10 that is made of native copper, the depth D2 of the portion that is located in the conductor swage piece 21 in the serrations 30 is smaller than the depth D1 of the portion that is located in the bottom plate 15, and therefore, in crimping the conductor crimp portion 20 to the conductor Wa, inward tilting can be avoided in the portion that is located in the conductor swage piece 21 in the serrations 30. As a result of this, even in a case where the crimp terminal 10 is formed by using native copper, in swaging the conductor swage pieces 21 and crimping the conductor crimp portion 20 to the conductor Wa, the edges of the serrations 30 can be easily caused to dig into the conductor Wa in the portions of the conductor swage pieces 21. Accordingly, force at the time of crimping can tear the oxide film of the core wire of the conductor Wa with the edges of the serrations 30 as a starting point, and a new surface obtained by removing the oxide film can come into contact with the core wire. As a result of this, the resistance of the crimp portion can be stably reduced.

Furthermore, in a state after the conductor crimp portion 20 has been crimped to the conductor Wa, a radius of curvature of the conductor swage piece 21 is smaller than a radius of curvature of the bottom plate 15 in the case of being viewed in the extending direction of the conductor Wa. Therefore, in the developed state of the conductor crimp portion 20, the depth D2 of the portion that is located in the conductor swage piece 21 in the serrations 30 is made smaller than the depth D1 of the portion that is located in the bottom plate 15, and therefore even in a case where the conductor swage pieces 21 have been curved at a small radius of curvature and have been swaged, the side faces 33 can be prevented from inwardly tilting due to compression force at the time of curving. As a result of this, even in a case where the conductor swage pieces 21 have been curved at a small radius of curvature and have been swaged, the width of the opening 31 in the portion that is located in the conductor swage piece 21 in the serrations 30 can be prevented from becoming smaller than the width of the bottom face 32. Accordingly, in a case where the conductor swage pieces 21 have been swaged, and the conductor crimp portion 20 has been crimped to the conductor Wa, the edges of the serrations 30 can be easily caused to dig into the conductor Wa, and force at the time of crimping can tear the oxide film of the core wire of the conductor Wa with the edges of the serrations 30 as a starting point. As a result of this, a new surface obtained by removing the oxide film can come into contact with the core wire, and electric resistance between the conductor Wa and the crimp terminal 10 can be reduced, and therefore the resistance of the crimp portion can be stably reduced.

Furthermore, the serrations 30 differ in depth between a side of the bottom plate 15 and a side of the conductor swage piece 21 by using, as a boundary, the swage piece base 22, which is a position having a large change in curvature at a time when the conductor swage pieces 21 are curved relative to the bottom plate 15 in crimping the conductor crimp portion 20 to the conductor Wa, and therefore electric resistance between the conductor Wa and the crimp terminal 10 can be reduced. Namely, in the serrations 30, a depth of a portion that is located closer to the conductor swage piece 21 than the swage piece base 22 is smaller than a depth of a portion that is located closer to the bottom plate 15, and therefore the side faces 33 can be prevented from inwardly tilting when the conductor crimp portion 20 is crimped to the conductor Wa. As a result of this, when the conductor crimp portion 20 has been crimped to the conductor Wa, the edges of the serrations 30 can be easily caused to dig into the conductor Wa, and force at the time of crimping can tear the oxide film of the core wire of the conductor Wa with the edges of the serrations 30 as a starting point.

Furthermore, in the serrations 30, the depth of the portion that is located closer to the bottom plate 15 than the swage piece base 22 is greater than the depth of the portion that is located closer to the conductor swage piece 21, and therefore a larger portion of the conductor Wa can be introduced into the serrations 30, and the edges of the serrations 30 can be caused to dig into the conductor Wa. Namely, in the serrations 30, the portion that is located in the bottom plate 15 has a relatively large radius of curvature even at the time of crimping to the conductor Wa, and therefore the side faces 33 are not likely to inwardly tilt. Therefore, when the conductor crimp portion 20 has been crimped to the conductor Wa, a larger portion of the conductor Wa can be introduced into the portion that is located in the bottom plate 15 in the serrations 30, and the edges of the serrations 30 can be easily caused to dig into the conductor Wa. As a result of this, force at the time of crimping can tear the oxide film of the core wire of the conductor Wa with the edges of the serrations 30 as a starting point, and a new surface obtained by removing the oxide film can come into contact with the core wire. Accordingly, when the conductor crimp portion 20 has been crimped to the conductor Wa, electric resistance can be reduced between the conductor Wa and the crimp terminal 10. As a result of this, the resistance of the crimp portion can be stably reduced.

Furthermore, in the conductor swage pieces 21, a depth D2 of the serrations 30 in the developed state of the conductor crimp portion 20 of a portion having a smallest radius of curvature in a state after crimping the conductor crimp portion 20 to the conductor Wa is smaller than a depth D1 of the portion that is located in the bottom plate 15. Therefore, when the conductor swage pieces 21 have been curved at a small radius of curvature and have been swaged, the side faces 33 can be prevented from inwardly tilting due to compression force, and the width of the opening 31 in the serrations 30 can be prevented from becoming smaller than the width of the bottom face 32. As a result of this, in a case where the conductor swage pieces 21 have been swaged, and the conductor crimp portion 20 has been crimped to the conductor Wa, the edges of the serrations 30 can be easily caused to dig into the conductor Wa, and force at the time of crimping can tear the oxide film of the core wire of the conductor Wa with the edges of the serrations 30 as a starting point. Accordingly, a new surface obtained by removing the oxide film can come into contact with the core wire, and therefore electric resistance between the conductor Wa and the crimp terminal 10 can be reduced. As a result of this, the resistance of the crimp portion can be stably reduced.

Variations

Note that in the embodiment described above, the serrations 30 formed in the conductor crimp portion 20 have a difference in level on the bottom face 32 in the developed state of the conductor crimp portion 20, and therefore the serrations 30 differ in depth between the side of the bottom plate 15 and the side of the conductor swage piece 21, but the depth of the serrations 30 may gradually change. Namely, in the serrations 30, a depth from the opening 31 to the bottom face 32 may gradually change between the side of the bottom plate 15 and the side of the conductor swage piece 21, and therefore the depth of the serrations 30 may differ between the side of the bottom plate 15 and the side of the conductor swage piece 21.

Furthermore, in the embodiment described above, three serrations 30 have been formed in the conductor crimp portion 20, but the number of serrations 30 formed in the conductor crimp portion 20 may be two or less, or may be four or more.

Furthermore, in the embodiment described above, description has been provided under the assumption that the crimp terminal 10 is used for a high-voltage electric wire W through which a current flows at a high voltage, but this is not restrictive, and the crimp terminal 10 may be used for a low-voltage electric wire W through which a current flows at a low voltage. Furthermore, the crimp terminal 10 may be a terminal that includes a coating swage portion that is swaged to a portion where the conductor Wa is coated with the insulating coating Wc in the electric wire W. Furthermore, the electrical connection portion 11 does not necessarily have the shape described above, and may have what is called a female terminal shape or a male terminal shape.

Furthermore, the crimp terminals according to the embodiment of the present invention and the variations that have been described above are not limited to the embodiment and the variations that have been described above, and various changes can be made without departing from the scope described in the claims. The crimp terminals according to the present embodiment and the variations may be configured by appropriately combining components in the embodiment or the variations that have been described above.

In the crimp terminal according to the present embodiment, in the serration formed in the conductor crimp portion, the depth in the position of at least part of the portion that is located in the conductor swage piece is smaller than the depth of the portion that is located in the bottom plate, in the developed state where the conductor crimp portion has a flat plate shape. As a result of this, in a case where the conductor crimp portion has been crimped to the conductor by swaging the conductor swage pieces, side faces can be prevented from inwardly tilting in portions that are located in the conductor swage pieces in the serration. Therefore, even in a case where the conductor crimp portion has been crimped to the conductor, the width of the opening in the portions that are located in the conductor swage pieces in the serration can be prevented from becoming smaller than the width of a bottom face in the serration. Accordingly, in a case where the conductor swage pieces have been swaged, and the conductor crimp portion has been crimped to the conductor, force at the time of crimping can tear an oxide film of a core wire of the conductor with edges of the serration as a starting point, and a new surface obtained by removing the oxide film can come into contact with the core wire, and therefore electric resistance can be reduced. As a result of this, an effect in which the resistance of the crimp portion can be stably reduced is exhibited.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A crimp terminal comprising:

a conductor crimp portion that includes a bottom plate on which a conductor of an electric wire being disposed, and a pair of conductor swage pieces extending from both side edges of the bottom plate in a direction that intersects an extending direction of the conductor, the conductor crimp portion being crimped and connected to the conductor of the electric wire, by covering the conductor disposed on the bottom plate with the pair of conductor swage pieces and swaging the conductor, wherein the conductor crimp portion includes a serration in the direction that intersects the extending direction of the conductor that is disposed on the bottom plate, on a face on a side that comes into contact with the conductor, the serration extending in a groove shape, the serration including a pair of first portions and a second portion, each of the first portions extending over a respective one of the pair of conductor swage pieces, the second portion extending from each of the first portions and over the bottom plate, and in a developed state where the conductor crimp portion has a flat plate shape before crimping to the conductor, a width in the extending direction of an opening of the serration is greater than or equal to a width in the extending direction of a bottom face of the serration, and a depth of each of the first portions of the serration is smaller than a depth of the second portion of the serration.

2. The crimp terminal according to claim 1, wherein in a state after the conductor crimp portion has been crimped to the conductor, a radius of curvature of each of the pair of conductor swage pieces in a case of being viewed in the extending direction of the conductor is smaller than the radius of curvature of the bottom plate.

3. The crimp terminal according to claim 1, wherein the serration differs in the depth between a side of the bottom plate and a side of each of the pair of conductor swage pieces by using, as a boundary, a position having a large change in curvature at a time when the pair of conductor swage pieces are curved relative to the bottom plate in crimping the conductor crimp portion to the conductor.

4. The crimp terminal according to claim 2, wherein the serration differs in the depth between a side of the bottom plate and a side of each of the pair of conductor swage pieces by using, as a boundary, a position having a large change in curvature at a time when the pair of conductor swage pieces are curved relative to the bottom plate in crimping the conductor crimp portion to the conductor.

* * * * *